Sept. 18, 1951  C. A. NICHOLS ET AL  2,568,248
ASSEMBLING APPARATUS

Filed May 31, 1946  12 Sheets-Sheet 1

INVENTORS

Sept. 18, 1951  C. A. NICHOLS ET AL  2,568,248
ASSEMBLING APPARATUS
Filed May 31, 1946  12 Sheets-Sheet 2

Sept. 18, 1951     C. A. NICHOLS ET AL     2,568,248
ASSEMBLING APPARATUS Filed May 31, 1946                                          12 Sheets-Sheet 3

INVENTORS

Sept. 18, 1951  C. A. NICHOLS ET AL  2,568,248
ASSEMBLING APPARATUS
Filed May 31, 1946  12 Sheets-Sheet 7

INVENTORS
Charles A. Nichols and Donald G. Mahoney
Lora E. Poole and Marshall D. McShurley
by Spencer Hardman & Fuhr
their ATTORNEYS Sept. 18, 1951 C. A. NICHOLS ET AL 2,568,248
ASSEMBLING APPARATUS
Filed May 31, 1946 12 Sheets-Sheet 9

Patented Sept. 18, 1951

2,568,248

UNITED STATES PATENT OFFICE 2,568,248

ASSEMBLING APPARATUS

Charles A. Nichols and Lora E. Poole, Anderson, and Donald G. Mahoney and Marshall D. McShurley, Muncie, Ind., assignors to General Motors Corporation, Detroit, Mich., a corporation of Delaware Application May 31, 1946, Serial No. 673,574

4 Claims. (Cl. 270—58)

This invention relates to machinery for stacking a plurality of different flat parts in predetermined sequence. The machine disclosed herein is particularly adapted for stacking plates and separators for storage batteries.

An object of the invention is to provide a machine comprising a conveyor having a plurality of holders, each for receiving the required number of parts, a plurality of magazines, each receiving a pile of parts to be stacked, the number of magazines equalling the total number of parts to be stacked in each holder of the conveyor, and means operating in timed relation with the conveyor for transferring the parts, one at a time, from the magazines to the holders while the conveyor continues its movement.

More particularly, it is an object to provide a transfer mechanism associated with each magazine and having vacuum cups which are lowered upon the uppermost part of each magazine stack and which become attached to the uppermost part by suction applied to the cups, the cups being lifted with a part attached thereto and then shifted laterally into vertical alignment with a conveyor holder, the vacuum then being broken so that the part descends from the cups to the holder. In connection with the foregoing it is a further object to provide for gradually lowering the holders as the conveyor moves so that the distances which the parts descend from the vacuum cups will be substantially the same.

A further object is to provide each magazine with means for automatically lifting its stack of parts so that the uppermost part remaining in the stack will be positioned for engagement by the suction cups when they descend upon it. This object is accomplished by the provision of a vertically movable platform actuated upwardly by mechanism having step-by-step motion and operated in timed relation with the conveyor.

A further object is to provide for reloading each magazine before all of the parts therein have been transferred to conveyor holders. This object is accomplished by providing for the descent of the platform while leaving within the reach of the vacuum cups a plurality of parts to be engaged thereby while additional parts are being placed upon the platform. Manually operable means are provided for elevating the platform so that the uppermost one of the reloaded parts engages or is in close proximity to the lowermost part held in reserve during the reloading operation.

A further object is to provide a machine of the character described, which is adapted for stacking different numbers of parts in the holders of the conveyor. In this connection, it is an object to provide for the construction of each magazine and its associated transfer mechanism as a unitary structure. To the conveyor frame there are secured a number of these units equalling the number of parts to be stacked in each conveyor holder. In this connection it is an object to provide a magazine and transfer unit of such construction that any one of the units can be removed from the machine without disturbing any of the other units.

Further objects and advantages of the present invention will be apparent from the following description, reference being had to the accompanying drawings, wherein preferred embodiments of the present invention are clearly shown.

In the drawings:

Fig. 4A is an enlargement of certain parts shown in Fig. 4.

The conveyor

Figure 1:
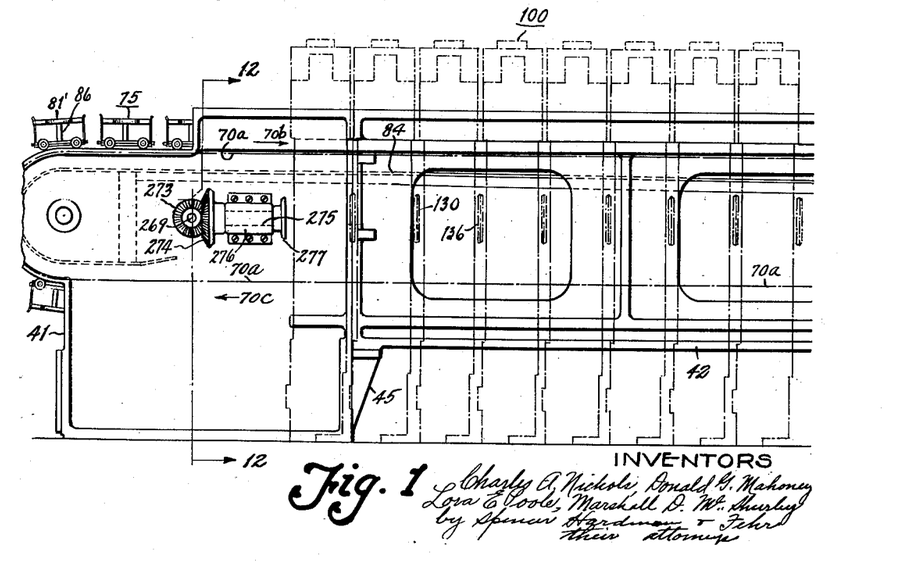
Figs. 1, 3 and 5 taken together, form a front elevation of the machine and Figs. 2, 4 and 6 constitute the rear elevation.
Figure 5:
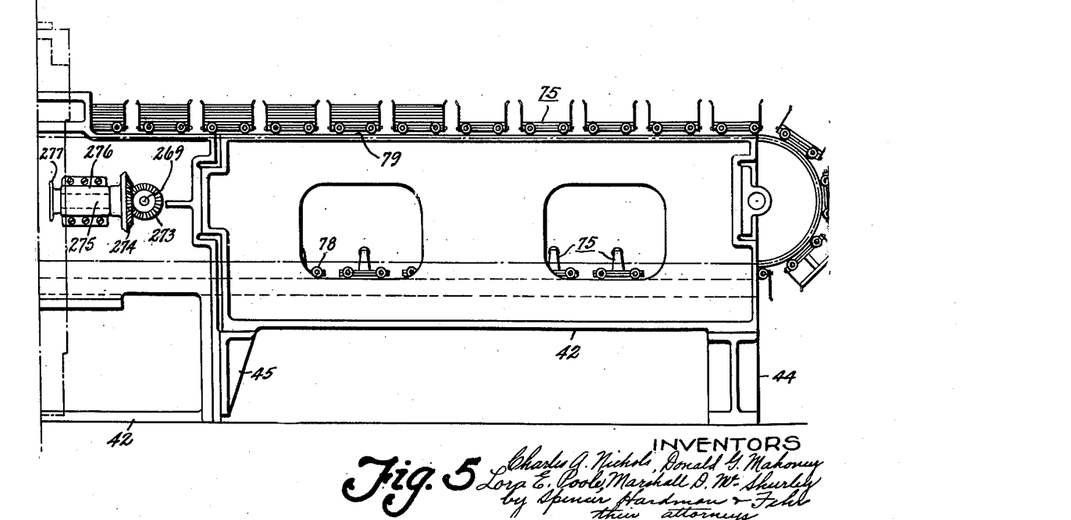

The supporting structure of the conveyor comprises chiefly front and rear side frames. The front-side frame (Figs. 1, 3, 5) comprises left end section 41 and right end section 42 and a plurality of intermediate sections 43 as may be required to accommodate the required number of magazine units 100 (shown in front elevation in Fig. 3) and duplicated diagrammatically. The rear-side frame comprises end section 51 (Fig. 6), opposite section 41 (Fig. 1), end section 52 (Fig. 2), opposite section 42 (Fig. 5) and the required number of intermediate sections 53. The number of units 100 equals the number of parts to be stacked, for example, the total number of plates and separators used in one cell of a storage battery. The frame sections are secured together by bolts, not shown, some of them rest upon the floor and others upon the pedestals 44 and brackets 45 for the front frame and pedestals 54 and brackets 55 for the rear frame.

Figure 2:
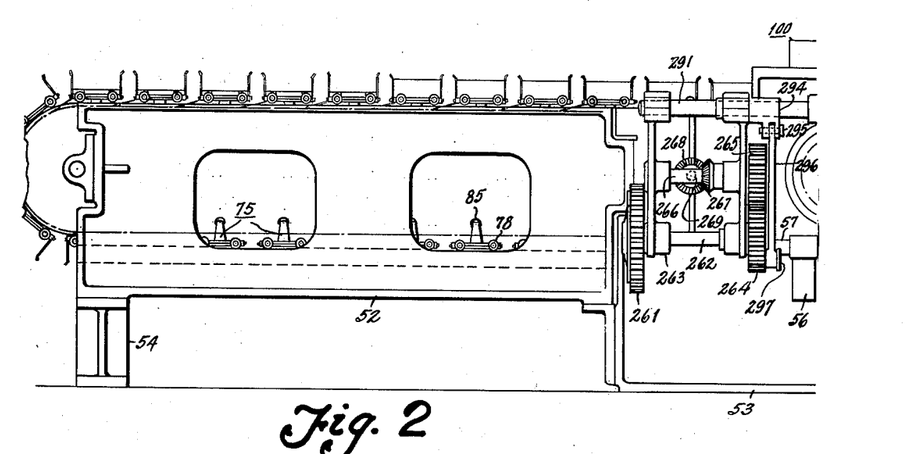
Figure 3:
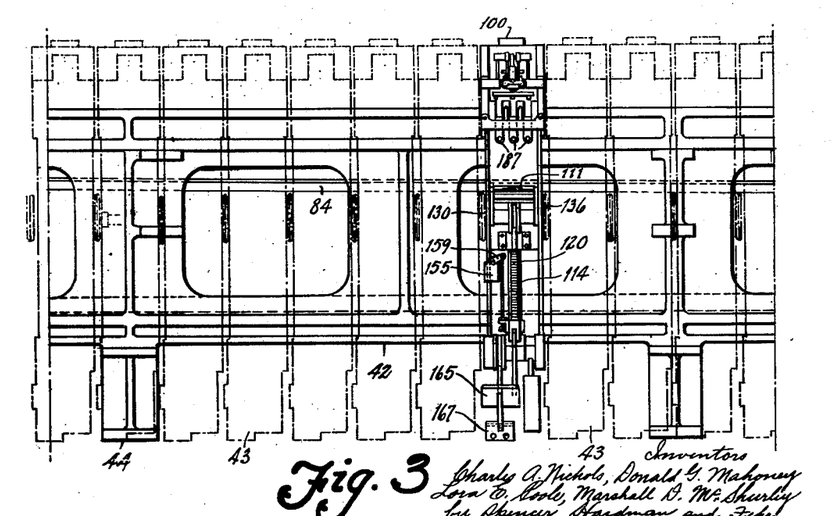
Figures 4, 4A:
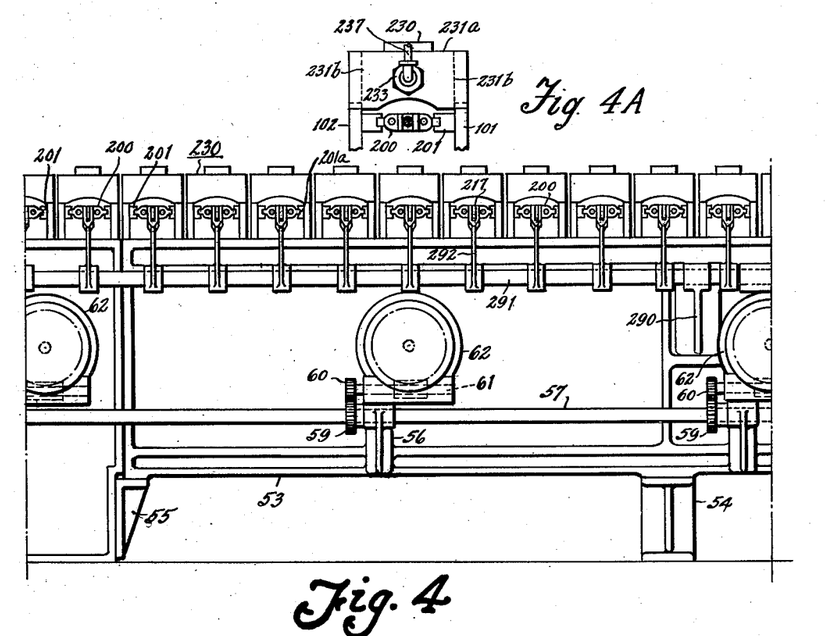
Figure 6:
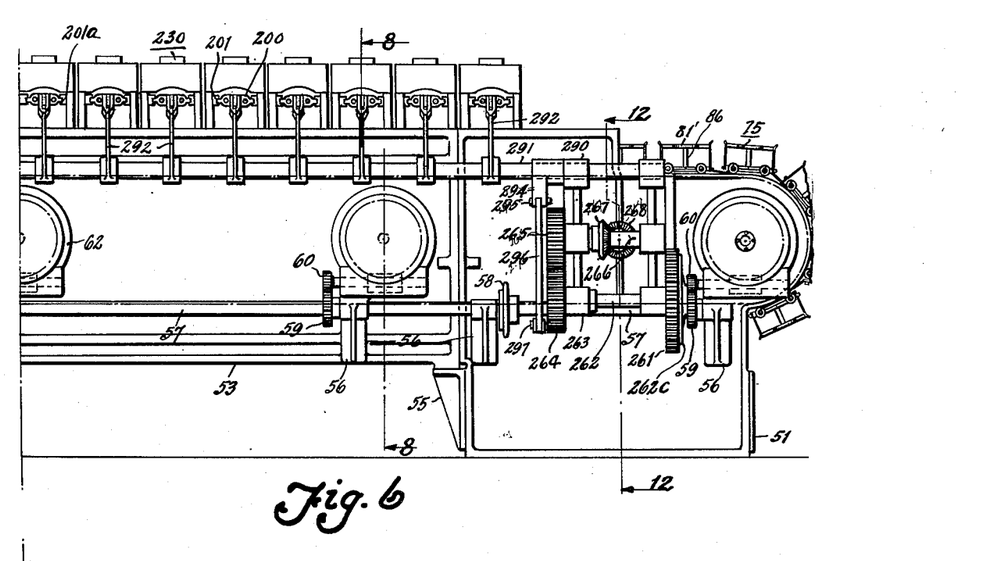
Figures 7, 7A, 7B:
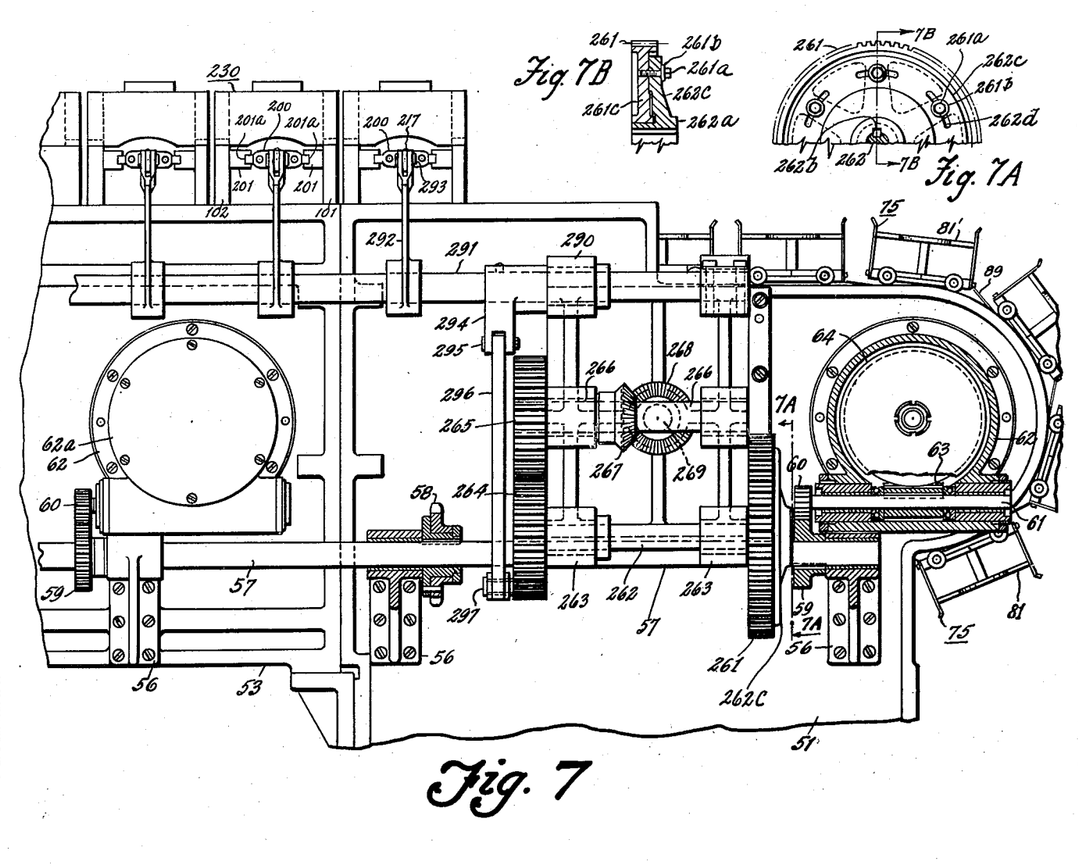
Fig. 7 is an enlargement of the right end of Fig. 6 and shows certain parts in longitudinal section.
Fig. 7A is a fragmentary view on line 7A—7A of Fig. 7.
Fig. 7B is a sectional view on line 7B—7B of Fig. 7A.
Figures 8, 9, 10, 11:
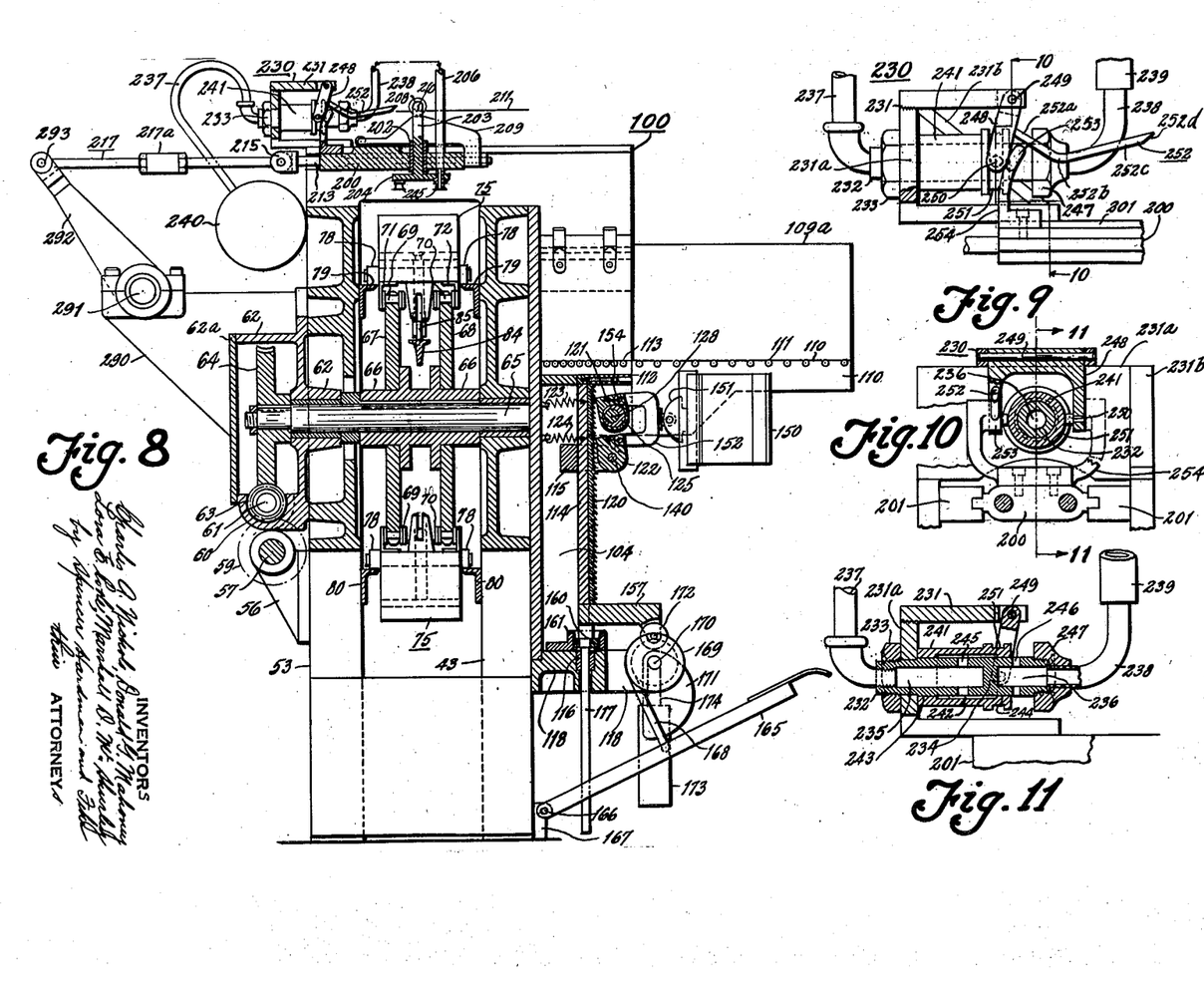
Fig. 8 is a sectional view on line 8—8 of Fig. 6 and is drawn to a larger scale.
Fig. 9 is a side elevation of the vacuum control valve at the upper part of Fig. 8 and is drawn to a larger scale than Fig. 8.
Fig. 10 is a sectional view on line 10—10 of Fig. 9.
Fig. 11 is a sectional view on line 11—11 of Fig. 10.

Bearing brackets 56 are attached to the rear frame, as shown in Figs. 2, 4 and 6, for supporting a main drive shaft 57. As shown in Figs. 6 and 7, shaft 57 is driven by a sprocket 58 which is connected by a chain, not shown, with speed reducing gearing driven by an electric motor, not shown. A plurality of gears 59, driven by shaft 57, mesh with gears 60, each of which drives a shaft 61 as shown best in Fig. 7. Shaft 61 is journaled in a housing 62 secured to a section of the rear side-frame assembly. Shaft 61 drives a worm 63 meshing with worm gear 64. As shown in Fig. 8, the worm gear 64 drives a shaft 65 journaled in bearings provided respectively by the housing 62 supported by left-frame section, such as 53 in Fig. 8, and provided by a front-frame section, such as 43 in Fig. 8. All of the shafts 65 are supported in the same manner. To the shaft 65, there is keyed a sleeve or hub 66 to which sprockets 67 and 68 are attached. Each pair of sprockets 67 and 68 engages conveyor chains 69 and 70. Certain links of chains 69 and 70, such as links 71 and 72, respectively, are attached by screws 73 and 74, respectively, to the bottom of a receptacle or work holder 75.

Figures 12, 13, 14, 15:
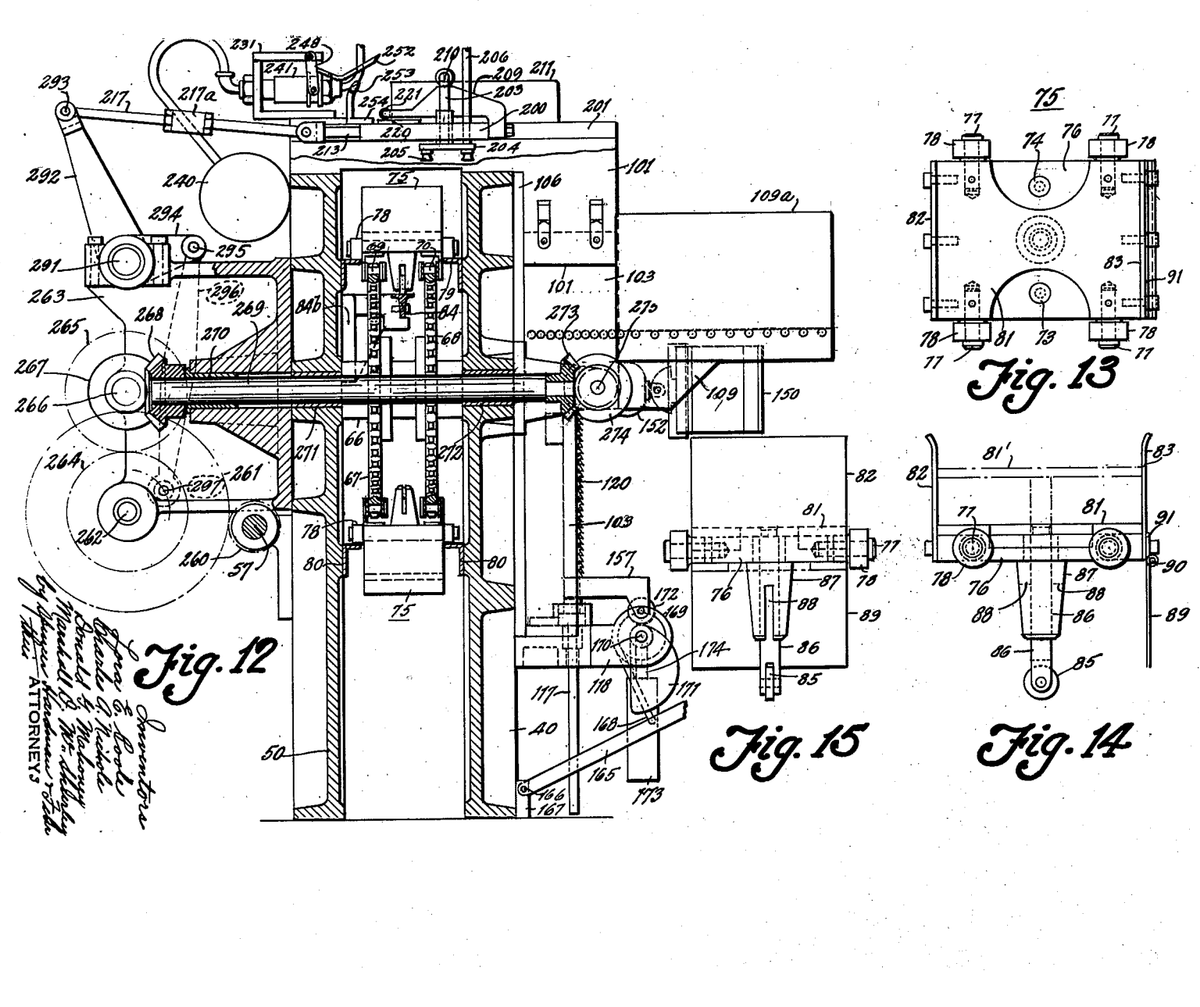
Fig. 12 is a sectional view on line 12—12 of Fig. 6 and drawn to a larger scale.
Figs. 13, 14 and 15 are, respectively, plan, side and end views of one of the conveyor work holders. These figures are drawn to a larger scale than Fig. 12.

Referring to Figs. 13 through 15, the work holder 75 comprises a bottom plate 76 supporting trunnions 77, each carrying a roller 78. While the receptacles 75 are in normal positions for receiving parts to be stacked, the rollers 78 rest upon upper rail 79 supported by the side frames. While the work holders are returning along the undersides of the sprockets, the rollers 78 rest upon lower rails 80. The base 76 supports an adjustable platform 81 which is movable between the end plates 82 and 83 attached to the base 76. When the filling of a work holder begins, the platform 81 will be located at 81' in Fig. 14. As the work holder progresses toward other magazine-transfer units, the platform 81 gradually descends to the full line position in Fig. 14. The descent of the platform 81 is controlled by a rail 84 which is slightly inclined downwardly leading from left to right in Figs. 1, 3 and 5. The conveyor chains 70 are represented by the dot-dash line 70a as in Fig. 1. The direction of movement of the upper parts of chains is to the right as indicated by arrow 70b and the lower parts of the chains move toward the left as indicated by arrow 70c. The platform 81 is supported by the rail 84 through the medium of a roller 85 rotatably supported by a rod 86 attached to the platform 81 and guided by a bushing 87 attached to the base plate 76. As shown in Fig. 15, the bushing 87 is notched at 88 to receive the roller 85 when it is in its uppermost position in which it would be positioned when the roller 85 engages the left end of the rail 84 in Fig. 1. The rail 84 (Figs. 1, 3 and 5) is so inclined that, as the work holder moves toward the right, the platform 81 gradually descends from the position 81' (Fig. 14). The gradual descent of the platform 81 provides for descent of a part from the suction cups of the transfer mechanism of a magazine unit the same minimum distance throughout the travel of the work holders from initial to final loading. In handling storage battery plates, this is an advantage since the distance should be as short as possible so as not to loosen the grid paste which is to provide the active material. In order to shield the conveyor chain, each work holder is provided with an apron 89 hinged at 90 to a plate 91 attached to the base 76. As shown in Fig. 7, the aprons 89 each extend from one work holder under the base plate to its adjacent work holder and thus cover the chain while at the same time providing for movement of the work holders relative to the chain as they move around the end sprocket wheels.

Figures 39, 40:
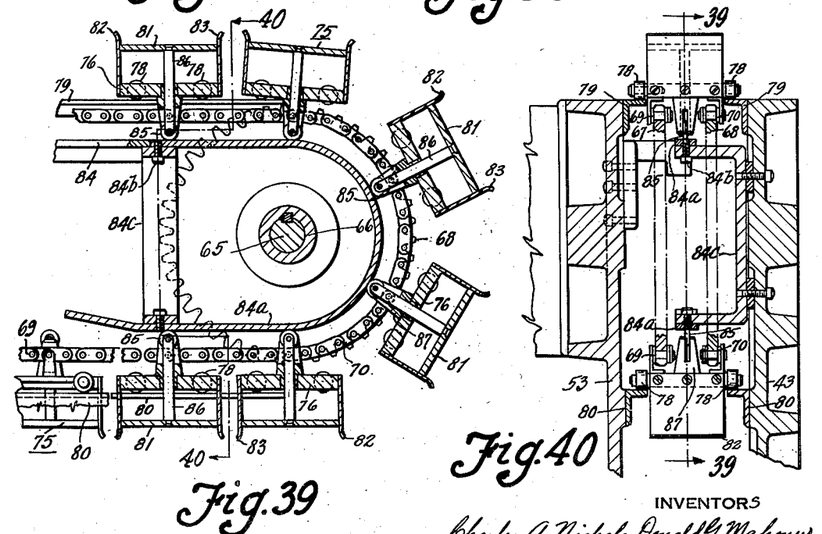
Fig. 39 is a fragmentary longitudinal sectional view of the conveyor at the same end as shown in Fig. 7.
Fig. 40 is a cross-sectional view on line 40—40 of Fig. 39.

While the work holders are moving along the underrails 80, the platforms gravitate to the position 81', Fig. 39. As each work holder moves from inverted to upright position, roller 85 engages a curved rail section 84a supported by a bracket 84c which prevents gravitation of the platform 81. As shown in Fig. 39, the work holder supporting rails 79 and 80 overlap, so that each work holder is supported at all times by at least one of the rails.

*Magazine-transfer unit*

Figures 16, 17:
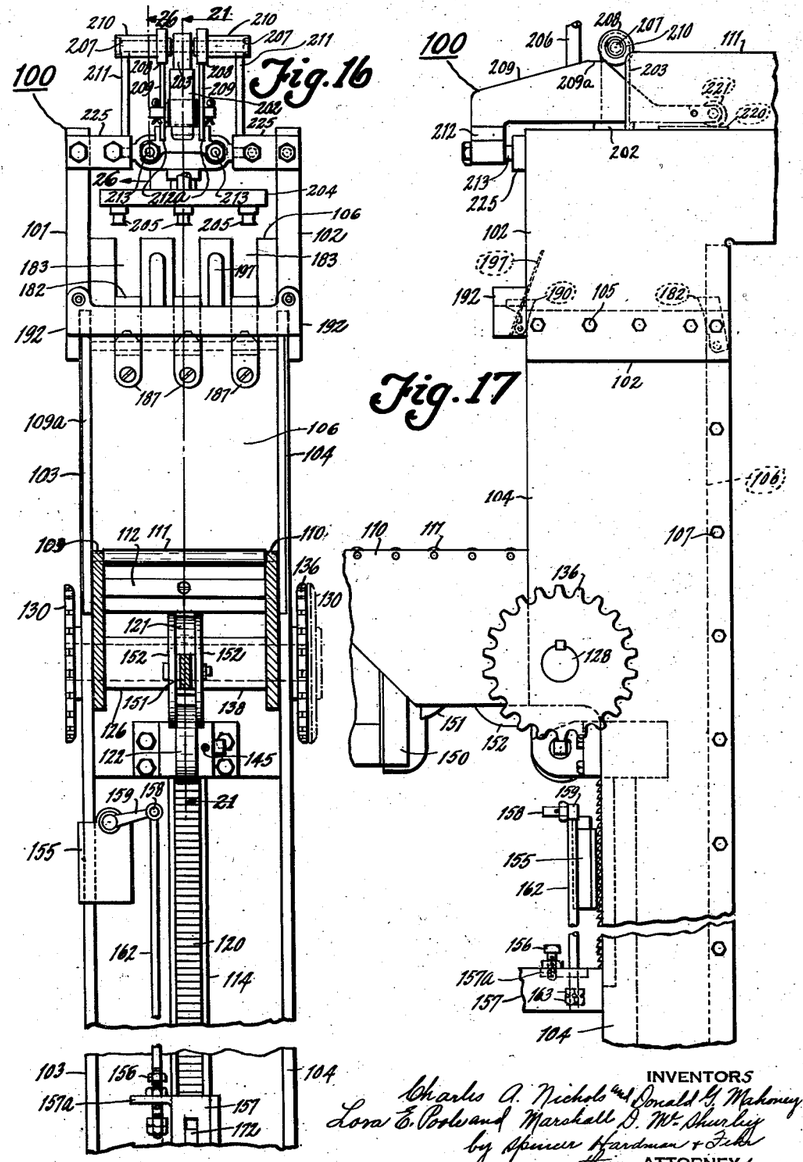
Figs. 16 and 17 are, respectively, front and side elevations of the upper portions of one of the magazine-transfer units. That portion of Fig. 16 in section is on line 16—16 of Fig. 21.
Figure 24:
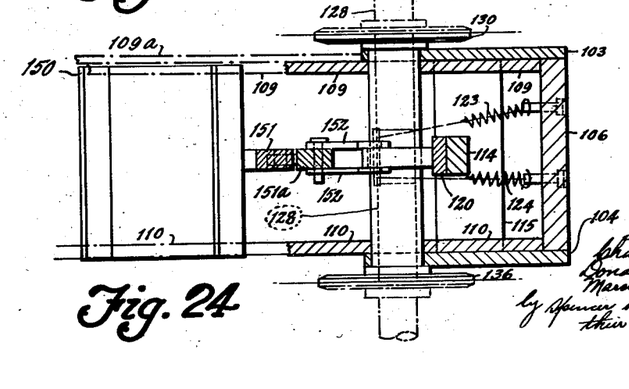
Fig. 24 is a sectional view on line 24—24 of Fig. 21.

The frame of the magazine-transfer unit 100 comprises, as shown in Figs. 12, 16 and 17, a pair of horizontally extending side plates 101 and 102 attached by screws 105 to a pair of vertically extending side plates 103 and 104, respectively. As shown in Fig. 12, the side plates 101 and 102 are mounted upon the conveyor side frame such as sections 40 and 50, for example. The vertical side plates 103 and 104 are attached to a back plate 106 which is secured to the front-side frames of the conveyor, such as the section 40 of Fig. 12. Screws 107 secure plates 103 and 104 to the back plate 106. The plates 103 and 104 support a pair of plates 109 and 110, respectively (Fig. 16), which support a series of rollers 111 upon which a stack of parts may be placed preparatory to movement thereof upon the rollers 113 of magazine platform 112 (Fig. 8). Rollers 113 are journalled in bearings provided by plate 112a attached to platform 112. The platform 112 is movable vetrically in the space enclosed between plates 103, 104 and 106, from a lower level in which the rollers 113 are on the level of the rollers 111 to an upper level at which the parts (storage battery plates or separators) are supported for engagement by vacuum cups of the transfer mechanism to be described. In order to provide for upward movement of the platform 112, there is supported a rod 114 guided by a bracket 115 which is supported between the plates 103 and 104 and guided also by bearing 116 which receives a rod 117 attached to the rod 114. Bearing 116 is mounted in a bracket 118 attached to the plates 103 and 104. The rod 117 is cylindrical. The rod 114 as shown in Fig. 24, is rectangular and received by the notch in the bracket 115. Hence, turning of the rod 114 is prevented.

Rod 114 is liftd by a mechanism having a step-by-step motion. For this purpose, the rod 114 carries a ratchet bar 120 engaged by an elevating pawl 121 and a retaining pawl 122. These pawls are urged by springs 123 and 124 against the ratchet bar 120. Pawl 121 (Fig. 29) is supported by an eccentric 125 provided by a sleeve 126 attached by pin 127 to a shaft 128 to which a key 129 secures a sprocket 130 whose hub is journaled in a bearing 131 supported by plate 103 and plate 109. Side plate 104 and plate 110 support a bearing 135 within which is journaled the hub of a sprocket 136 attached by key 137 to shaft 128. The pawl 121 is retained upon its eccentric 125 by a spacing sleeve 138 located between the hub of sprocket 136 and the right side of the eccentric 125. When the shaft 128 is rotated, the pawl 121 is lifted a distance slightly in excess of the spacing of the teeth of the ratchet bar 120 so that the retaining pawl 122 may move under a tooth of the ratchet bar and retain the bar while the pawl 121 descends in order to pick up the next succeeding ratchet tooth. By means to be described, the shaft 128 is continuously rotated. Retaining pawl 122 is mounted on the eccentric portion 140 of a shaft 141 supported by brackets 142 attached to a bar 143 supported between the plates 103 and 104. The shaft 141 has a square end portion 144 for receiving a wrench by which the shaft 141 may be turned in order to adjust the location of the retaining pawl 122. When the pawl 122 has been located properly, the shaft 141 is locked in the desired position of adjustment by a set screw 145.

Figures 18, 19, 20:
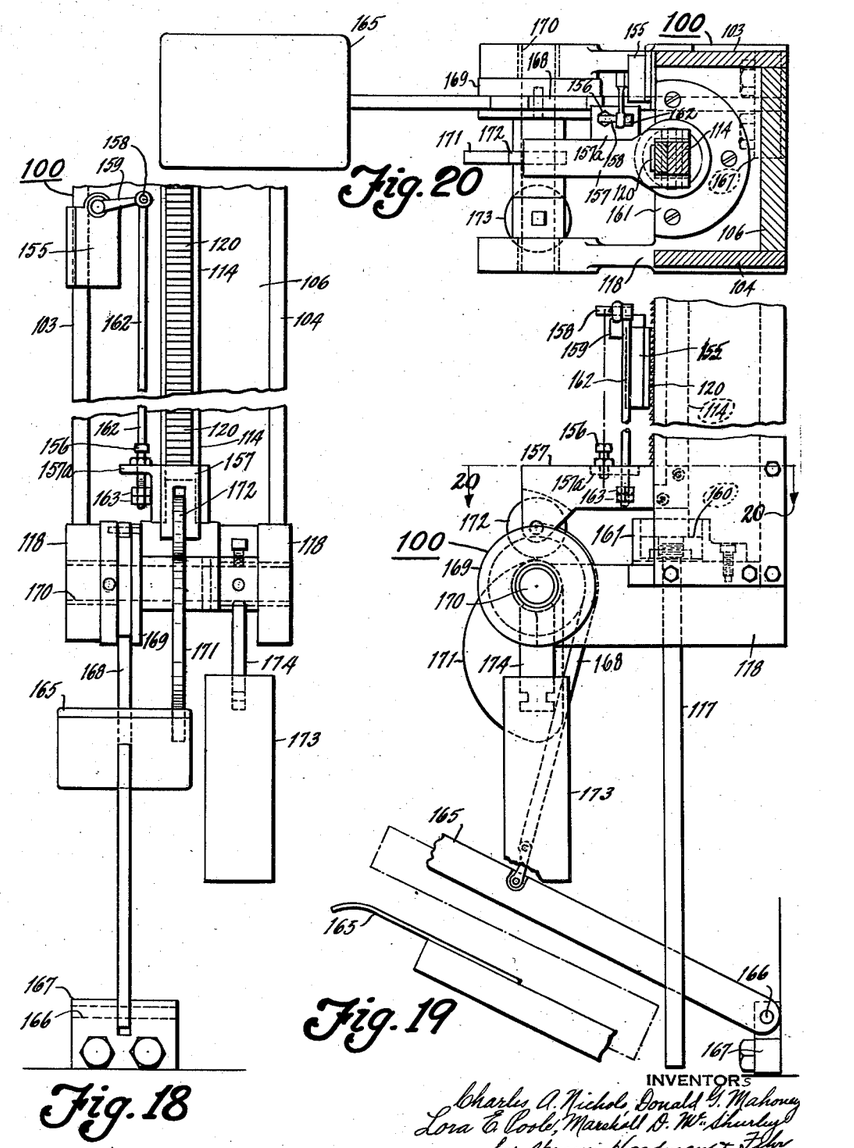
Figs. 18 and 19 are, respectively, front and side elevations of the lower portion of a magazine-transfer unit.
Fig. 20 is a view on the line 20—20 of Fig. 19.

By virtue of the reciprocating motion of the pawl 121, the platform 112 is caused to move upwardly until a predetermined elevation is reached when the pawls 121 and 122 are automatically retracted and the platform 112 gravitates to starting position shown in Fig. 8. The retraction of the pawls, by causing them to move counterclockwise (Fig. 21) about their supports, is effected by an electromagnet or solenoid 150 supported between the plates 109 and 110 and having an armature 151 connected by a link 151a with two yoke plates 152 which are provided with slots 153 (Fig. 21) each receiving a pin 154 with which a spring 123 or 124 is connected. The slots 153 permit counterclockwise movement of the ratchets 121 and 122 during their normal function. When the armature 151 moves right in Fig. 8 or left in Fig. 21, the yoke plates 152 move the pins 154 away from the ratchet bar 120 so that the platform 112 is free to gravitate. The solenoid is controlled by an electric switch 155 mounted on side plates 103, Figs. 16 and 18. When platform 112 is moved upwardly a certain distance, an adjustable screw 156 (Fig. 17) mounted on a bracket 157 attached to bar 114 engages a stud 158 carried by the operating arm 159 of the switch 155 and causes the arm to move counterclockwise as viewed in Figs. 16 and 18 to connect the solenoid 150 with a current source, not shown. The pawls 121 and 122 are retracted from the ratchet bar 120 so that the platform 112 is free to descend. Its descent is cushioned by the engagement of a piston 160 (Fig. 19) on rod 117 with a cylinder 161 mounted on bracket 118.

The return of the platform 112 to starting position effects automatically the opening of the switch 155 so that the pawls 121 and 122 are returned by the springs 123 and 124 to operating position. For this purpose, the stud 158 of the switch-lever 159 is connected with a rod 162 whose lower end passes through a hole in a lug 157a of bracket 157. The lower end of rod 162 is threaded to receive nuts 163 which are so adjusted that the descent of the bracket 157 causes its lug 157a to engage the upper nut 163 to move the rod 162 down and the arm 159 clockwise into position for opening the switch 155.

Figures 21, 22, 23, 23A:
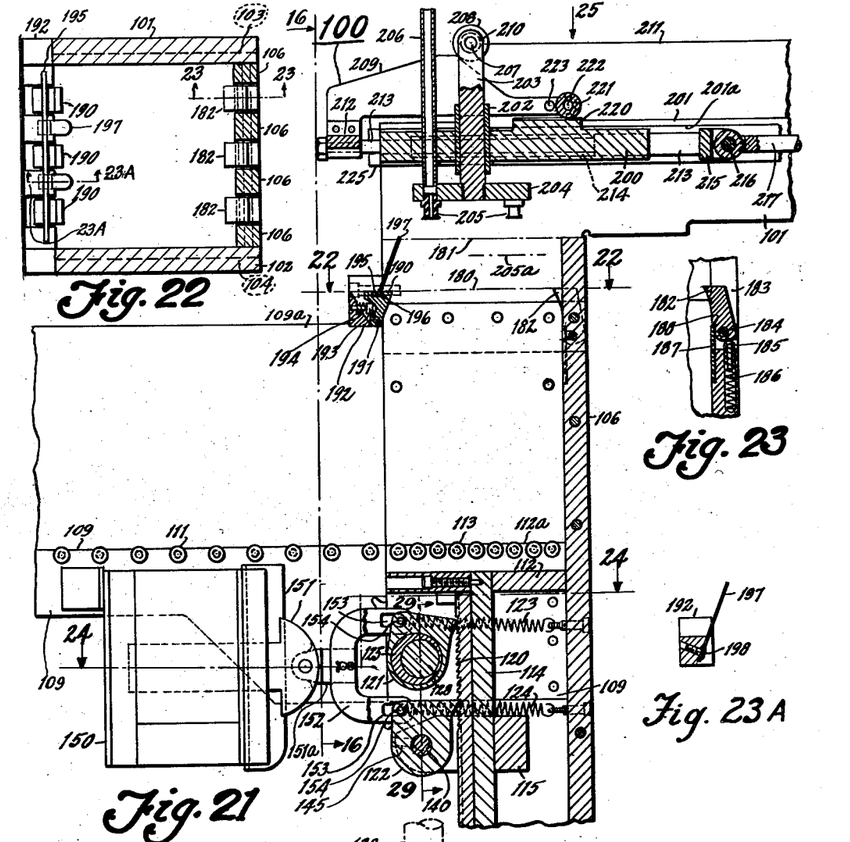
Fig. 21 is a fragmentary, sectional view on line 21—21 of Fig. 16.
Fig. 22 is a sectional view on line 22—22 of Fig. 21.
Fig. 23 is a sectional view on line 23—23 of Fig. 22.
Fig. 23A is a sectional view on line 23A—23A of Fig. 22.

Immediately following the descent of the platform 112 the operator moves a stack of parts (which may be aligned by a plate 109a extending above plate 109, Figs. 16 and 21) from the rollers 111 upon the rollers 113 carried by the platform 112. It is then necessary to move the stack of parts so that the uppermost part thereof will be in close proximity to the lowermost part of a group of parts being retained in the upper end of the magazine by means to be described. To effect this, the operator depresses a pedal lever 165 pivoted at 166 on a bracket 167 attached to a member of the front frame of the conveyor. Motion is transmitted by a chain 168 attached to the lever 165 to a wheel 169 fixed to a shaft 170 supported by the bracket 118. The shaft 170 is rotated counterclockwise in Fig. 8 or clockwise in Fig. 19 to cause the cam 171 to engage a roller 172 pivotally supported by bracket 157 and thus to lift the bracket 157 and the rod 114 and the platform 112. The pawl 122 will retain platform 112 approximately at position into which it is elevated by the operator. Then the operator releases the pedal 165 and the shaft 170 and parts carried thereby are returned to their original position by counterweight 173 connected with a rod 174 attached to the shaft 170. Thus the lever 165 is returned to its original position. The upward feeding of the magazine platform 112 continues by virtue of the reciprocation of the pawl 121 which is effected by the rotating shaft 128.

Figure 35:
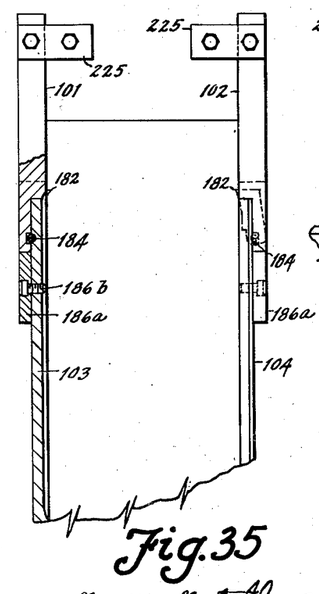
Figs. 35 and 36 are fragmentary front and side views, respectively, of a magazine when adapted for receiving battery plates, the magazine shown in Figs. 16, 17, 21, 22, 23 and 23A being adapted for receiving battery-plate separators.
Figures 36, 37:
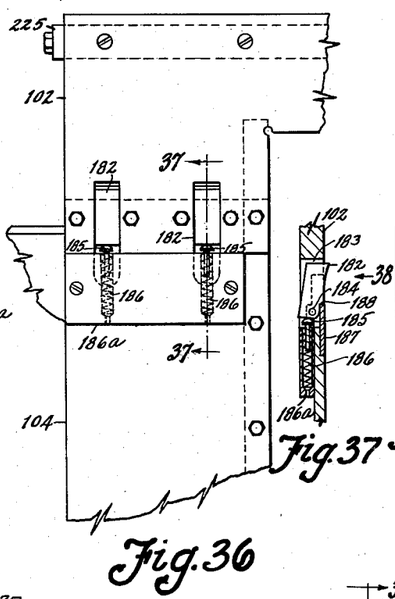
Fig. 37 is a fragmentary sectional view on line 37—37 of Fig. 36.
Figure 38:
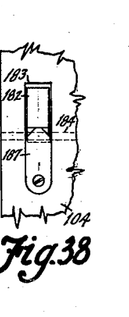
Fig. 38 is a fragmentary view in the direction of arrow 38 of Fig. 37.

At the instant the platform 112 is released and descends to its original position, the top edges of the rollers 113 will have been elevated slightly above a level represented by dot-dash line 180, Fig. 21, which represents the elevation of the underside of the lowermost stack of parts remaining in the magazine. The level of the upper surface of the uppermost part is represented by line 181. Therefore the reserve stack of parts is located between the levels 180 and 181. The reserve stack is retained by pawls which move into retaining position at the beginning of the descent of the platform 112 when released. If the magazine is to contain storage battery plates, it is provided with pawls 182 (Fig. 35) which move into position for engagement with the lower surface of the lowermost plate in the reserve stack. Pawls 182 are located in recesses 183 provided by the side plates 103 and 104. Each is pivoted upon a rod 184 and is urged into retaining position by a plunger 185 actuated by a spring 186 (Fig. 37). Counterclockwise movement of the pawl 182 is limited by a stop plate 187 engaging a shoulder 188 of the pawl. Plates 186a attached to the side plates 103 and 104 by screws 186b (Fig. 35) support the springs 186 and plungers 185. Rods 184 are confined in grooves provided by plates 101 and 103 on the left (Fig. 35) and provided by plates 102 and 104 on the right. If the magazine is to contain storage battery separators, the means for retaining the reserve stack is effected by a set of pawls 182 (Fig. 22) like pawls 182 of Fig. 37 supported by the back plate 106 and by a set of pawls 190 supported by rod 191 carried by a bar 192 which is attached to side plates 101 and 102. The pawls 190 are urged clockwise in Fig. 21 by plungers 193 actuated by springs 194. Clockwise movement of each pawl 190 is limited by a bar 195 received by a notch 196 in the pawl. Bar 195 is attached to bar 192. Separators are urged toward back plate 106 by spring fingers 197 attached by screws 198 to bar 192, shown in Fig. 23A.

*Transfer mechanism*

Figures 25, 26, 27, 28, 29, 30, 31, 32:
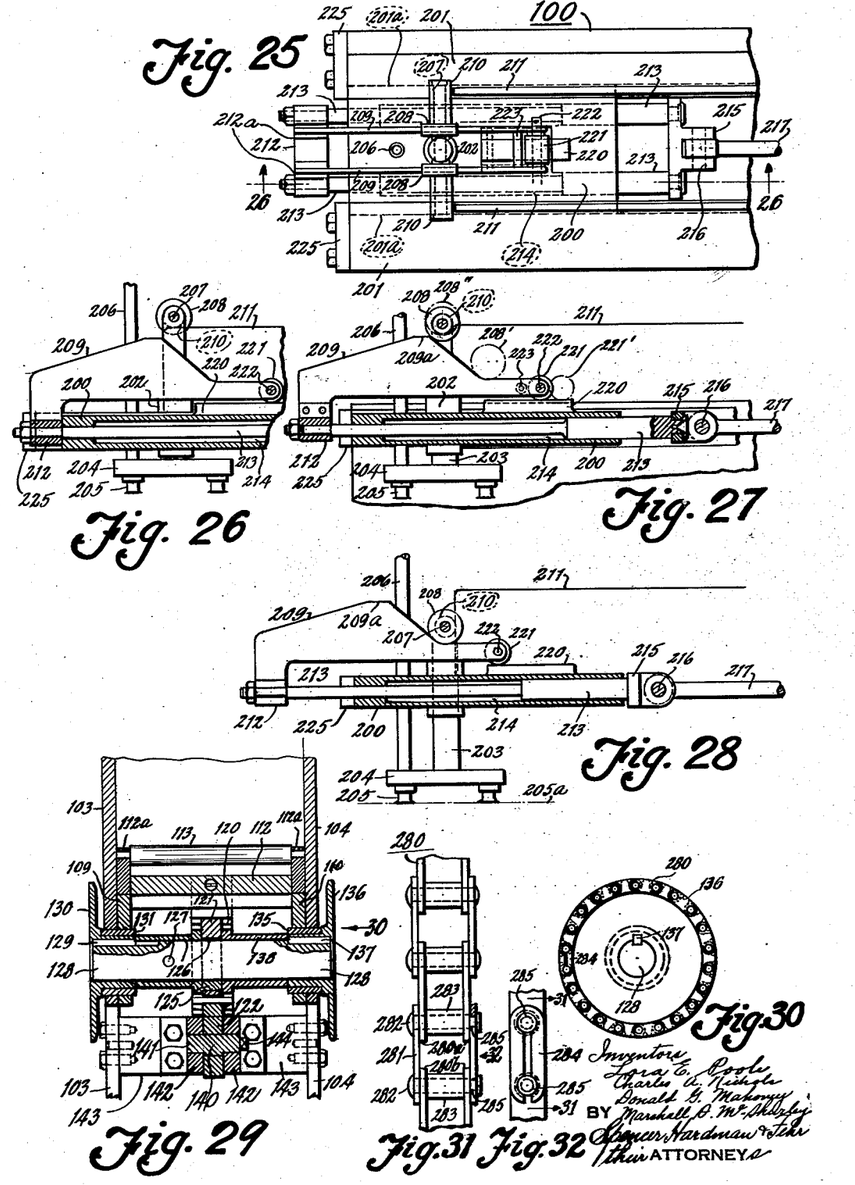
Fig. 25 is a fragmentary, top view of the front portion of a magazine-transfer unit.
Fig. 26 is a fragmentary, sectional view on line 26—26 of Fig. 25.
Figs. 27 and 28 are views, similar to Fig. 26, showing parts in other positions of operation.
Fig. 29 is a sectional view on line 29—29 of Fig. 21.
Fig. 30 is a view of a sprocket wheel and coupling chain looking in the direction of arrow 30 of Fig. 29.
Fig. 31 is an enlargement of a sprocket coupling chain shown in Fig. 30, that part of Fig. 31 which is in section is on line 31—31 of Fig. 32.
Fig. 32 is a view in the direction of arrow 32 of Fig. 31 and shows a detachable link of the chain coupling.

The transfer mechanism, as shown in Figs. 7, 8, 12, 16, 17, 21, and 25-28, comprises a plate or carriage 200 which is reciprocated horizontally by mechanism to be described. For this horizontal movement, it is guided and supported by guide plates 201 having grooves 201a and attached side plates 101 and 102. Plate 200 provides a tubular bearing 202 receiving a rod 203 supporting a plate 204 carrying a plurality of vacuum cups 205 connected by suitable passages with a pipe 206 extending from the plate 204 and slidable through an opening in the plate 200. The pipe 206 is attached by a hose or flexible tube to a vacuum controlling valve to be described. The rod 203 carries a shaft 207 which extends horizontally and which supports rollers 208 and engaging cam plates 209 and rollers 210 for engaging rails 211. Rails 211 are supported by the guide plates 201. Cam plates 209 are attached by yoke 212 to rods 213 which pass through holes 214 in plate 200 so that the cam plates 209 may be guided for horizontal movement relative to the plate 200. Rods 213 are connected with a yoke 215 which is pivotally connected by a pin 216 with a link 217 connected with a reciprocating mechanism to be described. Guidance of the plates 209 for horizontal movement relative to the plate 200 is effected also by the engagement of a pad 220 of plate 200 with roller 221 journaled on a pin 222 supported by the plates 209. The spacing of the plates 209 is determined by notches 212a provided by the yoke 212 for the reception of the plates and also by a spacer stud 223 (Fig. 25) joining the plates. As the rods 213 move toward the front of the machine, (right in Fig. 12 and left in Fig. 21), the plate 200 tends to move with the rods 213 due to the compression of the air being trapped within the holes 214 in plate 200 (Fig. 27). Movement of plate 200 toward the left is arrested by engagement with stops 225 fastened to the ends of the side plates 101 and 102 and guide-bars 201. Movement of the rods 213 is continuous to the position shown in Fig. 28. The rollers 210 leave the rails 211 and rollers 208 engage the cam plates 209. As plates 209 move left, the rollers 208 will descend upon the cams 209; and the vacuum cups 205, which are suspended thereby, will descend to the level indicated by line 205a in Fig. 28 and Fig. 21 or to whatever higher level is attained by the uppermost surface of the parts in the upper end of the magazine. The pipe 206 being connected with vacuum, the uppermost part in the magazine will adhere to the cups 205 as the cups ascend. Movement of the rods 213 toward the right (Fig. 28) causes cams 209 to move relative to the rollers 208, thereby lifting the rollers 208 to the position shown in Fig. 27, while rollers 210 ride along the vertical end edges of the rails 211. By the time that the lost motion between the yoke 212 and the left end of the plate 200 has been taken up, the rollers 208 will rest upon the horizontal surfaces 209a of the cam plates 209. Further right movement of the rods causes the plates 209 and the plate 200 to move together. At the start of this movement the rollers 210 ride over the rounded corners of the rails 211 and then upon the rails, as shown in Fig. 26. Rollers 208 have then moved to 208'' (Fig. 27). As the transfer mechanism travels toward the conveyor, the rollers 210 ride along the rails 211, thereby supporting the part adhering to the vacuum cups above the upper sides of the conveyor side frames. By the time the axes of the rollers 210 have been brought into alignment with the vertical center line of the conveyor so that the part transferred may gravitate upon the platform 81 of the conveyor receptacle 75, a valve will have been actuated to relieve the vacuum upon the cup.

The vacuum controlling valve will now be described with reference to Figs. 8 to 12. The valve unit 230 comprises a frame 231 having cross bars 231a (Fig. 4A) attached to brackets 231b each mounted on one of the plates 201. Bar 231a supports a part 232 attached thereto by a nut 233 and having a partition 234, spacing chambers 235 and 236 which are connected respectively with pipes 237 and 238. Pipe 238 is connected by a hose 239 with pipe 206 (Fig. 21), said hose having a loop which permits relative movement between the pipe 206 and the pipe 238. Pipe 237 is connected with a vacuum manifold 240 supported by the rear side frame of the conveyor in any suitable manner. The vacuum manifold 240 is connected with a vacuum pump and has a capacity such that it can supply needed vacuum to the cups in as many sets of transfer units as are required for the stacking operations. The part 232 supports a slide valve 241 having a groove 242 separating lands 243 and 244. When the valve is in the position shown in Fig. 11, ports 245 to the left of the partition 234 will be blocked and ports 246 to the right of the partition 234 will be opened to atmosphere, thereby breaking the vacuum in the cups 205. When the valve 241 is moved to the right so that it engages a nut 247 which couples the pipe 238 to the part 232, the ports 246 will be blocked from atmosphere and will be connected with the ports 245 by the groove 242. Then the vacuum cups are connected with the vacuum manifold. Movement of the valve 241 is effected by movement of a yoke 248 pivotally supported by a pin 249 attached to the frame 231. The arms of the yoke 248 carry pins 250 engaging a groove 251 provided by the valve 241. One arm of the yoke 248 carries a bent rod 252 having a downwardly extending portion 252a, an arcuate portion 252b, an upwardly extending portion 252c and a bevel-end portion 252d. The rod 252 is engageable with a lug 253 provided by a bracket 254 attached to the carriage plate 200.

When the valve 241 is in the position shown in Fig. 21, the vacuum cups are subjected to vacuum so that the uppermost part of the stack in the magazine will be transferred first upwardly and then horizontally toward the conveyor. As the part approaches the conveyor, the lug 253 rides under the part 252b of rod 252 and strikes an arm of the yoke 248, thereby causing it to move from the position shown in Fig. 12 to the position shown in Figs. 8 and 9. By the time the rod 203 has been positioned in vertical alignment with the center line of the conveyor, the valve 241 will have been moved into the position shown in Figs. 9 and 11, thereby breaking the vacuum in the cups and permitting the part to gravitate upon the work holder platform 81. During movement of the plate 200 toward the magazine, the lug 253 bears against the rod portion 252a and then under the arcuate portion 252b, thereby returning the valve 241 to the position shown in Fig. 12 so that vacuum is again applied to the cups. If, when the machine is first put into operation, the valve operating rod 252 should happen to be in the position shown in Fig. 9 when the lug 253 is moving toward the rod, lug 253 will engage rod surface 252d and begin to move the rod upwardly and further upwardly as the lug 253 engages the rod surface 252c. In this way breakage of parts is avoided due to the accidental misplacement of the rod 253 before the machine is put into operation.

*Magazine-transfer unit operating mechanism*

Referring to Figs. 6, 7 and 12, shaft 57 drives a gear 260 which meshes with a gear 261 connected with a shaft 262 supported by a bracket 263 fastened to one of the rear-side frame members. An angularly adjustable connection is provided between gear 261 and shaft 262. Referring to Figs. 7A and 7B, the hub of gear 261 supported by a hub 262a attached to shaft 262 by a key 262b and providing a plate 262c having arcuate slots 262d each for receiving a screw 261a passing through a washer 261b and threaded into a spoke 261c of the gear 261. The purpose of the adjustment effected between gear 261 and plate 262c is to synchronize the magazine-transfer mechanism with the conveyor so that a work holder will be vertically below the vacuum cups of a transfer mechanism when a part gravitates therefrom. Shaft 262 drives a gear 264 meshing with a gear 265 which drives a shaft 266 also supported by the bracket 263. Shaft 266 drives a bevel gear 267 meshing with bevel gear 268 connected with a shaft 269 supported by bearings 270, 271 and 272 and driving a bevel gear 273 which meshes with a bevel gear 274 (Fig. 12) which drives a shaft 275. Shaft 275 is supported by a bracket 276 attached to one of the front-side frame members and drives a sprocket 277. Shaft 275 is in alignment with all of the shafts 128 of all of the magazine-transfer units 100. The shaft 275 is connected with the shaft 128 immediately to the right thereof; and each shaft 128 is connected with its neighbor in a similar manner. For example, the adjacent sprockets 277 and 130 (Fig. 1) are, in effect, two half sprockets which, when juxtaposed, form a complete sprocket adapted to receive a sprocket chain 280 such as shown in Figs. 30 and 31. This chain 280 is wrapped around the abutting half sprocket members and the ends 280a and 280b are joined by a detachable link 281 fixed to pins 282 passing through spacing sleeves 283 and retained by a resilient retainer 284, the arms of which can snap into grooves 285 provided by the pins 282. The shaft 275 and the shafts 128 of magazine units provide in effect one continuous shaft when they are coupled together by the sprocket chains which engage the half sprocket members such as 277 and 130, Fig. 1, or 136 and 139. Removal of any one of the magazine-transfer units without disturbing any other unit can be effected with great facility since the shaft section 128 of the unit to be removed can easily be uncoupled from its neighboring shafts simply by uncoupling and removing the sprocket chains. By removing the screws which fasten the magazine-transfer unit to the conveyor frame and the bracket 167 to the front of the conveyor frame, the unit may be easily removed. Obviously the hose 239 will be removed and the transfer operating link 217 must be uncoupled from its operating mechanism.

The mechanism for reciprocating the links 217 will now be described. The rear side frame of the conveyor carries brackets 290 supporting a shaft 291, carrying a plurality of arms 292 each connected by a pin 293 with a link 217. The link 217 may include two end sections and an intermediate turnbuckle 217a by which the length of the link may be adjusted in order that the position of the transfer mechanism relative to the frame may be adjusted to the proper position in which the vacuum cups will be brought into proper relation to the magazine at one end of the oscillation of the lever 292 and with the conveyor work holders at the other end of the oscillation of the lever 292. The shaft 291 carries an arm 294 connected by a pin 295 with a link 296 connected with a crank pin 297 fastened to gear 264.

When the machine uses a relatively large number of magazine-transfer units, it is desirable to distribute the transmission of power to both ends of shaft 291. Therefore the mechanism shown in Figs. 6 and 7 is duplicated substantially in Fig. 2. Thus shaft 291 is driven at both ends. The sprocket 58 (Fig. 7) can be located mid-way on shaft 57 further to distribute the loading. Likewise, the long shaft consisting of short sections 275 (Figs. 1 and 5) and aligned sections 128 (Fig. 29) connected by sprockets and chain couplers may be driven at both ends or the center coupler can be omitted so that the long shaft is divided into two substantially equal shorter sections each driven at one end thereof.

Figures 33, 34:
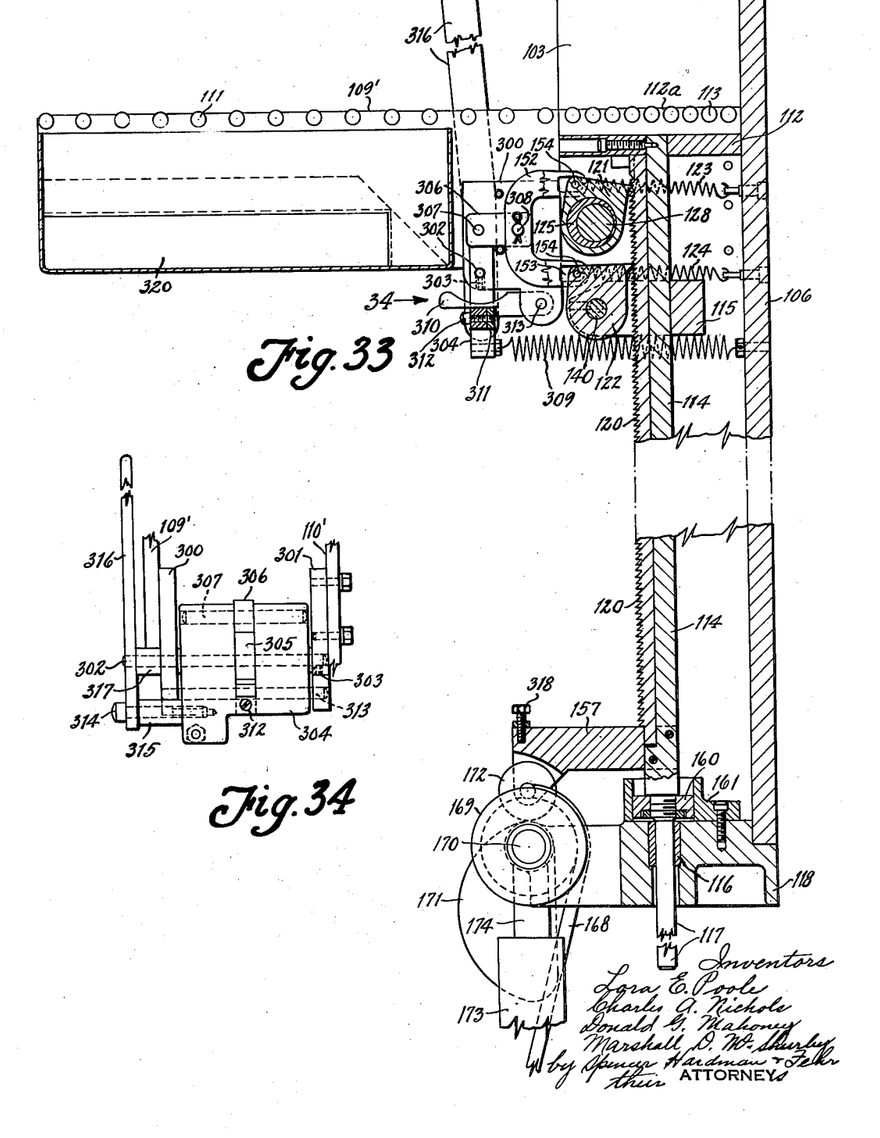
Fig. 33 is a vertical, longitudinal sectional view of a magazine unit provided with a modified form of control for the parts elevating platform.
Fig. 34 is a view in the direction of arrow 34 of Fig. 33.

The control of the pawls 121 and 122 of each magazine unit can be effected by means other than a solenoid 150. Fig. 33 shows an alternative construction. To plates 109' and 110' corresponding to plates 109 and 110 of Fig. 29, there are secured plates 300 and 301 respectively which support a rod 302 secured by a set screw 303. Rod 302 pivotally supports a plate 304 having a notch 305 receiving a link 306 connected by pin 307 with the plate 304 and connected by pin 308 with the yoke plates 152. A spring 309 connecting plate 304 and 106 urges the plate 304 counterclockwise toward a latch lever 310 which engages a wear piece 311 attached to plate 304 by a screw 312. Lever 310 is pivoted on a rod 313 supported by plates 300 and 301. Plate 304 is connected by screw 314 and spacer 315 with a lever 316 attached to a hub 317 journaled on rod 302.

When the platform 112 reaches the upper level of its travel, a screw 318 attached to bracket 157 engages latch lever 310 to cause it to separate from wear piece 311 thereby permitting spring 309 to move the plate 304 and the lever 316 counterclockwise to effect left movement of link 306, yokes 152 and pawls 120 and 121 whereupon the platform 112 gravitates to the lowest level just as it did when solenoid 150 was energized. The operator moves a stack of parts from rollers 111 to rollers 113 and moves lever 316 clockwise to permit engagement of the pawls 120 and 121 with the ratchet bar 120 so that upward feeding of the platform 112 may be resumed. As the lever 316 is moved clockwise, the latch lever 310 gravitates into engagement with wear piece 311; and lever 316 will then be retained in pawl-to-ratchet engaging position.

In the modification shown in Figs. 33 and 34, the return of the pawls to ratchet-engaging position is effected manually instead of automatically as in the form first disclosed. The omission of the feature of automatic pawl-reengagement is offset by simplification of construction and reduction of cost and also by saving in the space occupied by the solenoids, thereby making possible the location of a dust collector duct 320 under the rollers 111 upon which there are located the parts from which loose particles and dust may be removed by suction from the duct.

While the embodiments of the present invention as herein disclosed, constitute preferred forms, it is to be understood that other forms might be adopted, all coming within the scope of the claims which follow.

What is claimed is as follows:

1. A battery plate and separator assembling machine comprising a horizontally moving conveyor having a plurality of equally spaced plate holders each adapted to receive plates and separators, a motor, a mechanism connecting the motor with the conveyor for moving the conveyor continuously, a plurality of magazines adjacent the conveyor and equally spaced the distance between the plate holders of the conveyor, said magazines respectively containing vertical stacks of positive and negative plates and separators in the sequence in which they occur in a battery, transfer devices respectively aligned with the magazines and each including pick-up means for removing the topmost plate from the magazine and for carrying said plate to a location directly above the conveyor, timed control means for causing said pick-up means to release the plate when located directly above one of said plate holders on the conveyor, and means operated by said mechanism for operating the transfer devices and control means and in timed relation to conveyor movement whereby the released plates gravitate upon the conveyor plate-holders.

2. A machine according to claim 1 in which each plate holder has a vertically movable platform which receives the falling plates, each platform being supported by a roller which engages a fixed track which is downwardly inclined in the direction of movement of the holders as they are being filled, the inclination of the track being such that, as a holder moves from a position in alignment with one transfer device to a position in alignment with the next transfer device, the platform of that holder descends a distance substantially equal to the average thickness of the plates and separators.

3. A battery plate and separator assembling machine comprising a horizontally moving conveyor having a plurality of equally spaced holders each adapted to receive plates and separators, a motor, a mechanism connecting the motor with the conveyor for moving the conveyor continuously, magazines equally spaced the distance between the plate holders of the conveyor, said magazines respectively containing vertical stacks of positive and negative plates and separators in the sequence in which they occur in a battery, a shaft, means driven by said mechanism for effecting an oscillation of said shaft during movement of the holders between positions of alignment with said magazines, a plurality of aligned levers attached to the shaft, a plurality of transfer devices respectively aligned with the magazine and each having a horizontally reciprocable member connected with a lever on said shaft and having a horizontally movable carriage means for transmitting motion from the member to the carriage in a direction to move the carriage away from the magazine, means for transmitting motion from the member to the carriage toward the magazine and permitting over-travel of the member, the last mentioned means comprising piston and cylinder elements one element being provided by the member and the other by the carriage, a fixed stop engaged by the carriage when located vertically above the magazine, further movement of the member in one direction causing air in the cylinder to be compressed to urge the carriage against the stop, movement of the member in the opposite direction to take up the lost motion reducing air compression in the cylinder while the carriage remains against the stop, means for effecting descent of the device in response to movement of the member in one direction after the carriage has been stopped and for effecting ascent of the device and plate retained thereby in response to reverse movement of the member to take up lost motion, and means for causing said provisions to release the plate upon arrival of the carriage at a position vertically above a conveyor plate-holder.

4. A battery plate and separator assembling machine comprising, in combination, a conveyor having a plurality of equally spaced plate holders associated therewith, driving means for continuously moving the conveyor and its plate holders, a plurality of magazines adjacent the conveyor and equally spaced the distance between the plate holders on the conveyor, successive magazines carrying supplies of positive plates, separators and negative plates, transfer devices associated with each magazine, each device including pick-up means thereon for moving the topmost plate from the magazine and for transporting said plate to a location directly above the conveyor, timed control means for nullifying the action of the pick-up means for releasing the plate when located directly above one of said plate holders whereby the plate gravitates upon the plate holder, and a fixed track adjacent the sides of the conveyor and engaging the plate holders, said track being downwardly inclined in the direction of movement of the conveyor, the inclination being such that as a plate holder moves from a position beneath one transfer device to a position beneath the next transfer device that the holder descends a distance substantially equal to the average thickness of the plates being stacked thereon whereby the uppermost plate on each plate holder is always substantially the same distance from the transfer device at any station.

CHARLES A. NICHOLS.
LORA E. POOLE.
DONALD G. MAHONEY.
MARSHALL D. McSHURLEY.

REFERENCES CITED

The following references are of record in the file of this patent:

UNITED STATES PATENTS

| Number | Name | Date |
|---|---|---|
| 336,378 | Wood | Feb. 23, 1886 |
| 380,898 | Johns | Apr. 10, 1888 |
| 628,829 | Mercer | July 11, 1899 |
| 1,065,085 | Steere | June 17, 1913 |
| 1,069,009 | Heinrich | July 29, 1913 |
| 1,086,391 | Molyneux | Feb. 10, 1914 |
| 1,089,274 | Von Sazenhofen | Mar. 3, 1914 |
| 1,119,342 | Burnham | Dec. 1, 1914 |
| 1,366,549 | Winkley | Jan. 25, 1921 |
| 1,711,647 | Milmoe | May 7, 1929 |
| 1,865,750 | Elwell | July 5, 1932 |
| 1,941,106 | Park, Jr. | Dec. 26, 1933 |
| 2,021,360 | Halvorsen | Nov. 19, 1935 |
| 2,137,381 | Blackstone | Nov. 22, 1938 |
| 2,167,470 | West | July 25, 1939 |
| 2,324,523 | Lund | July 20, 1943 |